US008533190B2

(12) United States Patent
Walker

(10) Patent No.: US 8,533,190 B2
(45) Date of Patent: Sep. 10, 2013

(54) METHOD AND SYSTEM FOR SELECTING RECORDS FROM A DATABASE

(76) Inventor: Peter Walker, Aireys Inlet (AU)

( * ) Notice: Subject to any disclaimer, the term of this patent is extended or adjusted under 35 U.S.C. 154(b) by 154 days.

(21) Appl. No.: 12/408,264

(22) Filed: Mar. 20, 2009

(65) Prior Publication Data

US 2009/0249254 A1    Oct. 1, 2009

(30) Foreign Application Priority Data

Sep. 22, 2006   (AU) .............................. 2006905262
Sep. 21, 2007   (WO) ................ PCT/AU2007/001394

(51) Int. Cl.
*G06F 17/30*   (2006.01)

(52) U.S. Cl.
USPC ........... 707/731; 707/723; 707/728; 707/748; 707/749; 715/834

(58) Field of Classification Search
USPC ................. 707/723, 728, 748–749
See application file for complete search history.

(56) References Cited

U.S. PATENT DOCUMENTS

| | | | |
|---|---|---|---|
| 6,326,962 B1 * | 12/2001 | Szabo | 715/762 |
| 7,181,438 B1 * | 2/2007 | Szabo | 1/1 |
| 7,188,106 B2 * | 3/2007 | Dwork et al. | 1/1 |
| 2004/0059626 A1 | 3/2004 | Smallwood | |
| 2005/0144158 A1 * | 6/2005 | Capper et al. | 707/3 |
| 2005/0203918 A1 * | 9/2005 | Holbrook | 707/10 |
| 2005/0210025 A1 * | 9/2005 | Dalton et al. | 707/5 |
| 2008/0126303 A1 * | 5/2008 | Park et al. | 707/3 |
| 2010/0161620 A1 * | 6/2010 | Lamere et al. | 707/749 |

FOREIGN PATENT DOCUMENTS

| WO | WO 97/37312 | 10/1997 |
|---|---|---|
| WO | WO 01/08070 A1 | 2/2001 |
| WO | PCT/AU2007/001394 | 3/2009 |

OTHER PUBLICATIONS

Havre et al., "Interactive Visualization of Multiple Query Results", 2001, IEEE (INFOVIS'01).*

* cited by examiner

*Primary Examiner* — Nevee Abel Jalil
*Assistant Examiner* — Jagdish Pandya
(74) *Attorney, Agent, or Firm* — Dunlap Codding, P.C.

(57) ABSTRACT

The present invention relates generally to methods and systems for searching and retrieving records from a database and in particular to capturing a user's preferences to facilitate retrieval of records from the database in accordance with those preferences. The invention is suitable for use in applications in which the records retrieved from the database correspond to books, films, music or the like and it will be convenient to describe the invention in relation to that exemplary, but non-limiting, application.

11 Claims, 17 Drawing Sheets

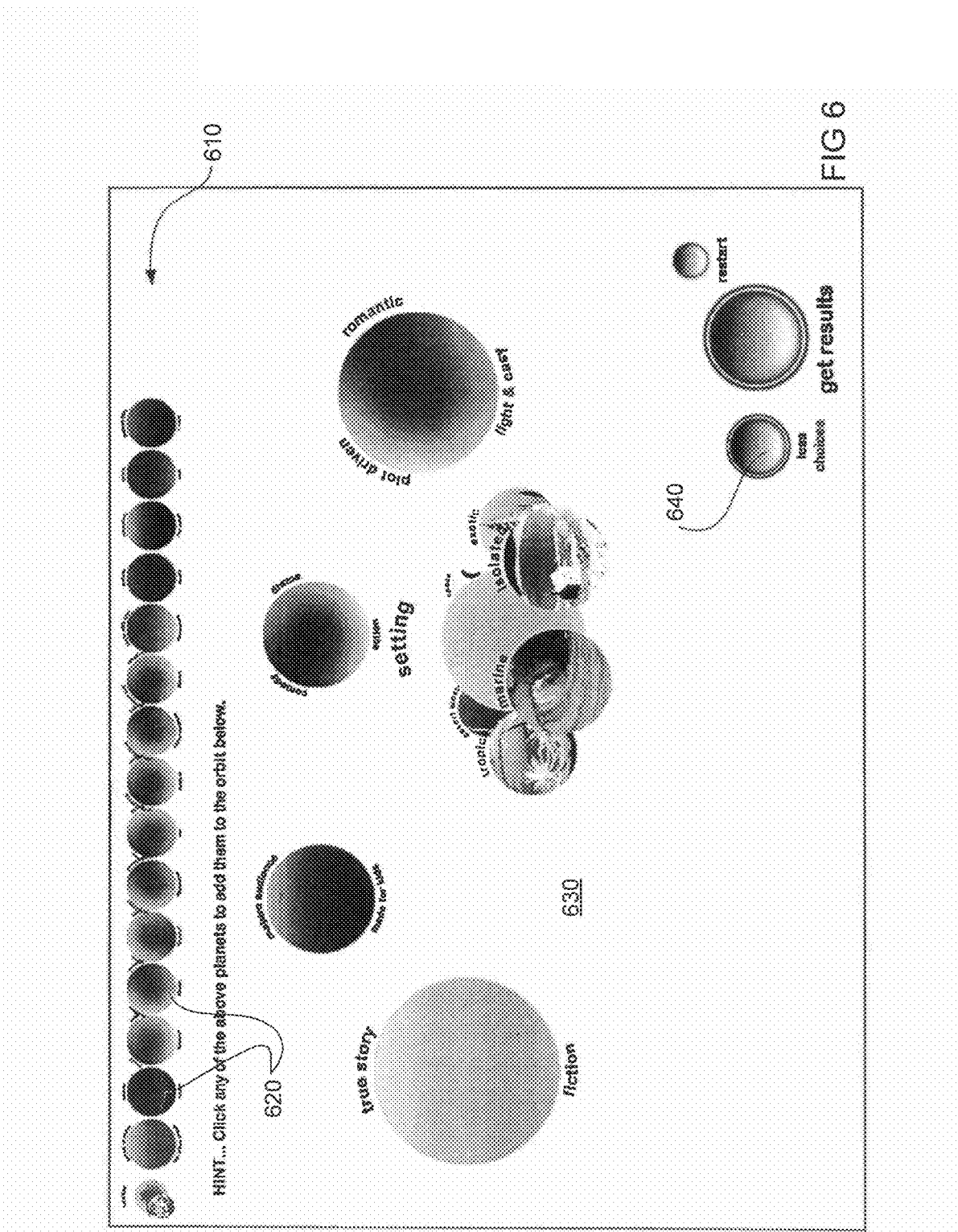

| | A | B | C | D | E | F | G |
|---|---|---|---|---|---|---|---|
| 1 | DISPLAY TITLE | TITLE | YEAR | ENTERED OR REVISED BY | ENTRY OR REVISION DATE | FEATURE FILM | TRUE STORY |
| 1900 | The Court Jester | Court Jester, The | 1956 | PH | 25/07/2007 | 9 | 0 |
| 1901 | Mr. Deeds Goes to Town | Mr. Deeds Goes to Town | 1936 | PH | 25/07/2007 | 9 | 0 |
| 1902 | Spy Kids 3-D: Game Over | Spy Kids 3-D: Game Over | 2003 | PH | 25/07/2007 | 9 | 0 |
| 1903 | Elf | Elf | 2003 | PH | 25/07/2007 | 9 | 0 |
| 1904 | Pocketful of Miracles | Pocketful of Miracles | 1961 | PH | 25/07/2007 | 9 | 0 |

FIG 9A

| | | | | | | |
|---|---|---|---|---|---|---|
| The Trouble with Harry | Trouble with Harry, The | 1955 | PH | 25/07/2007 | 9 | 0 |
| The Card | Card, The | 1952 | PH | 19/07/2007 | 9 | 1 |
| Pillow Talk | Pillow Talk | 1959 | PH | 26/07/2007 | 9 | 0 |
| Porridge | Porridge | 1975 | PH | 26/07/2007 | 0 | 2 |
| Road to Utopia | Road to Utopia | 1945 | PH | 25/07/2007 | 9 | 0 |

FIG 9B

| 0 | 0 | 8 | 0 | 1 |
|---|---|---|---|---|
| 0 | 0 | 0 | 0 | 0 |
| 0 | 0 | 0 | 0 | 0 |
| 5 | 4 | 5 | 6 | 4 |
| 0 | 4 | 0 | 3 | 3 |
| 8 | 7 | 7 | 6 | 6 |
| 7 | 7 | 8 | 6 | 8 |
| 7 | 8 | 6 | 7 | 7 |

FIG 9D

| SYM | M0 | M1 | M2 | M3 | M4 | M5 | M6 | M7 | M8 | M9 | CAN | M0 | M1 | M2 | M3 | M4 | M5 |
|---|---|---|---|---|---|---|---|---|---|---|---|---|---|---|---|---|---|
| U9 | 3200 | 3200 | 3200 | 3200 | 3200 | 64 | 27 | 8 | 1 | 0 | U9 | 3200 | 3200 | 3200 | 3200 | 3200 | 3200 |
| U8 | 3200 | 3200 | 3200 | 3200 | 64 | 27 | 8 | 1 | 0 | 1 | U8 | 3200 | 3200 | 3200 | 3200 | 3200 | 3200 |
| U7 | 3200 | 3200 | 3200 | 64 | 27 | 8 | 1 | 0 | 1 | 8 | U7 | 3200 | 3200 | 3200 | 3200 | 3200 | 3200 |
| U6 | 3200 | 3200 | 64 | 27 | 8 | 1 | 0 | 1 | 8 | 27 | U6 | 3200 | 3200 | 3200 | 3200 | 128 | 8 |
| U5 | 3200 | 64 | 27 | 8 | 1 | 0 | 1 | 8 | 27 | 64 | U5 | 3200 | 3200 | 3200 | 64 | 8 | 0 |
| U4 | 64 | 27 | 8 | 1 | 0 | 1 | 8 | 27 | 64 | 3200 | U4 | 3200 | 128 | 64 | 4 | 0 | 8 |
| U3 | 27 | 8 | 1 | 0 | 1 | 8 | 27 | 64 | 3200 | 3200 | U3 | 64 | 8 | 1 | 0 | 4 | 64 |
| U2 | 8 | 1 | 0 | 1 | 8 | 27 | 64 | 3200 | 3200 | 3200 | U2 | 4 | 1 | 0 | 1 | 27 | 128 |
| U1 | 1 | 0 | 1 | 8 | 27 | 64 | 3200 | 3200 | 3200 | 3200 | U1 | 1 | 0 | 1 | 4 | 128 | 3200 |
| U0 | 0 | 1 | 8 | 27 | 64 | 3200 | 3200 | 3200 | 3200 | 3200 | U0 | 0 | 1 | 4 | 27 | 128 | 3200 |

FEATURE FILM
TRUE STORY
ANIMATION

FUTURE

METHOD AND SYSTEM FOR SELECTING RECORDS FROM A DATABASE

CROSS-REFERENCE TO RELATED APPLICATIONS

The present application claims priority to and benefit under 35 U.S.C. §119 and §365 of International Application PCT/AU2007/001394, filed Sep. 21, 2007; which in turn, claims priority to the Australian patent application Serial No. 2006905262, filed on Sep. 22, 2006, the entire contents of International Application PCT/AU2007/001394 and Australian patent application Serial No. 2006905262 are hereby expressly incorporated herein by reference.

BACKGROUND OF THE INVENTION

1. Field of the Invention

The present invention relates generally to methods and systems for searching and retrieving records from a database and in particular to capturing a user's preferences to facilitate retrieval of records from the database in accordance with those preferences. The invention is suitable for use in applications in which the records retrieved from the database correspond to books, films, music or the like and it will be convenient to describe the invention in relation to that exemplary, but non-limiting, application.

2. Brief Description of Related Art

Numerous search techniques have been developed to facilitate the retrieval of records based on keywords entered by a user. Such techniques however, require that the user has specific information about the item that they are searching for. For example, if the user is searching for a book, the user must be able to enter at least one keyword corresponding to a title, an author, or a publisher. If the user is searching for a motor vehicle, the user must be able to enter at least one keyword corresponding to a model, a make, or a type of vehicle. Such search techniques typically generate a significant number of hits. Many will not meet the requirements of the user.

Searching by keywords requires that the user be able to think laterally in the selection of suitable keywords to maximise the chances of the user locating a record of interest. These drawbacks make such search techniques frustrating to the user, particularly where there are significant numbers of records to choose from.

It would therefore be desirable to provide a method and system for facilitating the provision of more meaningful search results to a user by extracting as much detail as possible regarding the user's preference before executing the search. It would also be desirable to provide a user friendly user interface to enable a user to enter their preferences in a more intuitive manner. It would also be desirable to provide a method for capturing user preferences in relation to one or more criteria that ameliorates or overcomes one or more disadvantages of existing user preference capturing methods. It would also be desirable to provide a method of making a selection from a plurality of records in a database that ameliorates or overcomes one or more disadvantages of existing selection methods.

SUMMARY OF THE INVENTION

According to a first aspect of the present invention, there is provided a method for capturing user preferences in relation to one or more criteria, the user preferences to be used to facilitate selection of one or more records from a database, each of the records having been assigned a plurality of rankings, each ranking being determined in relation to one of the criteria. The method includes the following steps: (a) displaying to the user an interactive user interface including one or more graphical elements, each graphical element representing a single criterion or a group of criteria; and (b) the user selecting a graphical element to submit a preference in relation to the one or more criteria represented by that graphical element.

In one or more embodiments, at least one of the graphical elements represents at least two criteria and the method further includes the step of the user selecting a point on the graphical element to indicate the user's relative preference between the criteria represented by the graphical element.

In one form of the invention, each of the criteria represented by the graphical element may have a corresponding pole and the proximity of the point selected by the user to the pole may indicate the degree of preference for the criterion associated with the pole.

The method may further include the step of converting the point to one or more numeric values, each numeric value corresponding to a user preference in relation to one of the criteria represented by the graphical element.

A first numeric value corresponding to the user preference in relation to a first criterion may be derived from a first segment map which divides the graphical element into a series of segments relative to a first pole associated with the first criterion.

Each segment in the series may be assigned a numeric value corresponding to a degree of user preference in relation to the first criterion, and each of the segments in the series may extend along an axis away from the corresponding pole to an opposing point.

The graphical element may represent at least two criteria and a second numeric value corresponding to the user preference in relation to a second criterion may be derived from a second segment map which is superimposed with the first segment map to divide the graphical element into a series of segments relative to a second pole associated with the second criterion, each segment in the series being assigned a second numeric value corresponding to a degree of user preference in relation to the second criterion.

For each segment map, the extent of each segment along the axis may decrease as the distance of that segment from the corresponding pole increases. The relationship between the distance from the pole and the corresponding numeric value may be non-linear.

At least one of the graphical elements may represent a single criterion and the graphical element may include a primary graphic representing the criterion, the primary graphic being associated with one or more secondary graphics each representing a sub set of the criterion. The one or more secondary graphics may appear to orbit around the primary graphic. Selection of the secondary graphic by a user may cause a numeric value corresponding to a user preference in relation to the criterion represented by the graphic to be recorded.

In one or more embodiments, the rankings assigned to each record may be determined by one or more experts. Alternatively, the rankings assigned to each record may be determined by one or more users who each enter their own rankings in relation to each of the plurality of criteria for each record which has been reviewed by the user.

Another aspect of the invention provides a method of making a selection from a plurality of records in a database, each record being assigned a plurality of rankings, each ranking being determined in relation to one of a plurality of criteria. The method includes the following steps: (a) capturing preferences indicated by a user in relation to one or more criteria; (b) comparing the user preferences with the rankings assigned to each record; and (c) providing to the user one or more best-match records whose rankings most closely correspond to the user preferences. The rankings assigned to each record and the user preferences may be expressed as numeric values.

The step of comparing the user preferences with the rankings assigned to each record may involve computing the difference between the numeric value corresponding to the user preference in relation to each criterion and the numeric value corresponding to the ranking assigned to each record in relation to the same criterion, and generating an overall match value for each record which corresponds to a sum of the differences between the user preference value and the ranking value corresponding to each of the criteria. The method may further include the step of raising to an integer power each of the differences between the user preference value and the ranking assigned to each record corresponding to each of the criteria prior to generating the overall match value.

In an alternative embodiment, the step of comparing the user preferences with the rankings assigned to each record involves deriving the individual difference values for the criteria from a series of matrices, each matrix providing a plurality of numeric values corresponding to various permutations of user preference values and record rankings for a particular criterion. An overall match value may then be generated for each record, the overall match value corresponding to a sum of the individual difference values derived from the series of matrices.

The method may further include the step of generating a user profile based on the user preferences, wherein the user profile is stored in a user profile database for later retrieval.

The method may further include the step of the user applying a weighting to one or more of the criteria prior to a comparison being made between the user preferences and the rankings assigned to each record.

The step of capturing preferences indicated by a user in relation to one or more of the plurality of criteria may be carried out in accordance with the method for capturing user preferences described above.

Another aspect of the invention provides a system for making a selection from a plurality of records in a database, each database record being assigned a plurality of rankings, each ranking being determined in relation to one of a plurality of criteria, the system comprising a processor and associated memory device for storing a series of instructions to cause the processor to carry out a method for capturing user preferences described above.

Another aspect of the invention provides a system for making a selection from a plurality of records in a database, each database record being assigned a plurality of rankings, each ranking being determined in relation to one of a plurality of criteria, the system comprising a processor and associated memory device for storing a series of instructions to cause the processor to carry out a method of making a selection from a plurality of records in a database as described above.

Another aspect of the invention provides computer software for use in a system for making a selection from a plurality of records in a database, each database record being assigned a plurality of rankings, each ranking being determined in relation to one of a plurality of criteria, the system comprising a processor and associated memory device for storing the computer software including a series of instructions to cause the processor to carry out a method for capturing user preferences described above.

Another aspect of the invention provides computer software for use in a system for making a selection from a plurality of records in a database, each database record being assigned a plurality of rankings, each ranking being determined in relation to one of a plurality of criteria, the system comprising a processor and associated memory device for storing the computer software including a series of instructions to cause the processor to carry out a method of making a selection from a plurality of records in a database as described above.

BRIEF DESCRIPTION OF THE SEVERAL VIEWS OF THE DRAWINGS

FIG. 6 is a screen view showing the interactive user interface according to an embodiment of the invention.

FIG. 10 shows sample matrices for providing numerical values for deriving individual difference values corresponding to various permutations of user preference and record ranking.

DETAILED DESCRIPTION OF EXEMPLARY EMBODIMENTS

Figure 1:
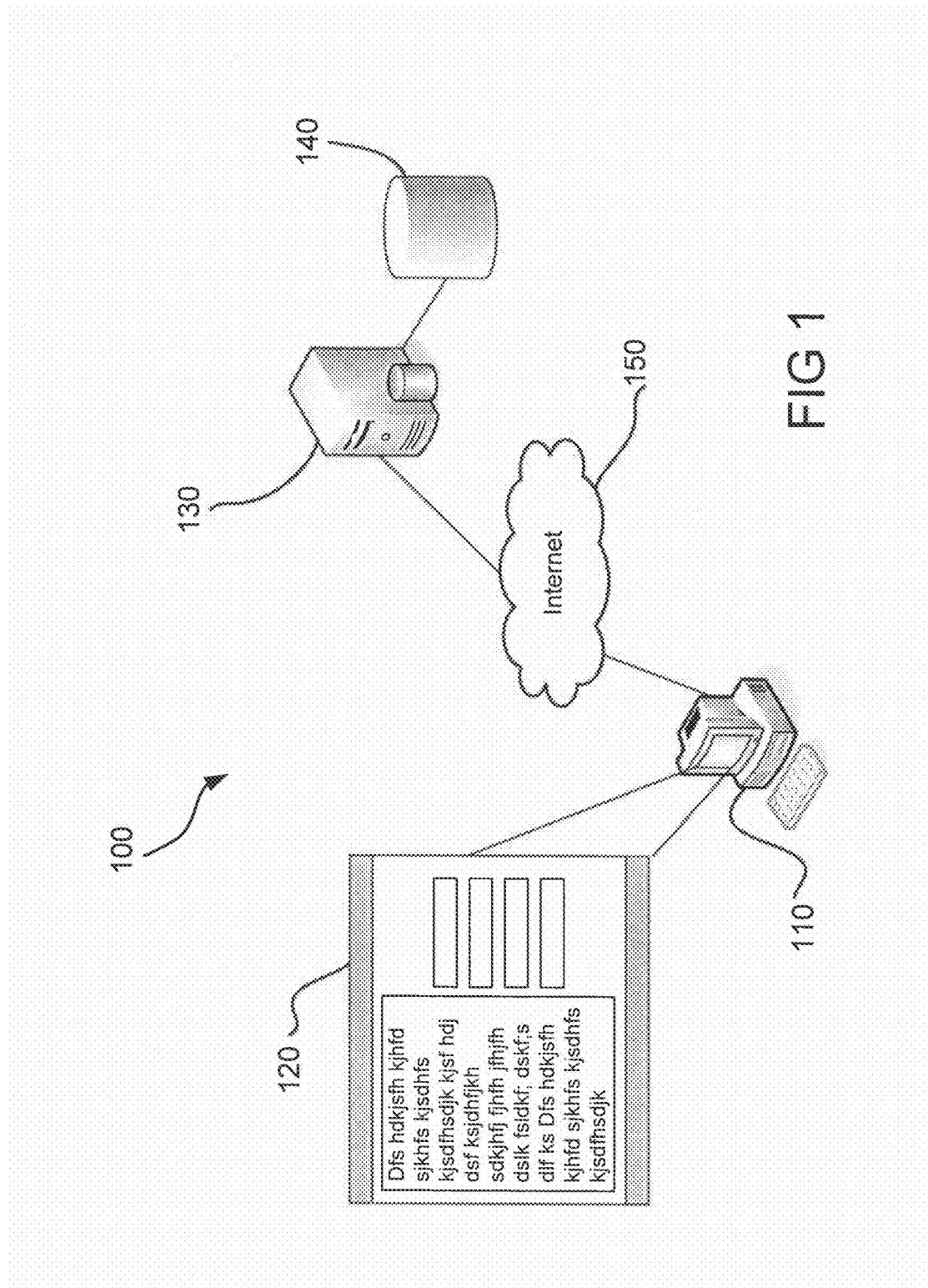
FIG. 1 is a schematic diagram showing a computer-enabled system for making a selection from a plurality of records in a database.

Referring now to the figures and in particular to FIG. 1, shown therein is an example system for making a selection from a plurality of records in a database. The system 100 includes a client user terminal 110 providing a graphic user interface 120, and a database 140 in communication with the server 130 and the client user terminal 110. The client user terminal 110 and server 130 are interconnected by means of the Internet 150 or any other suitable communications network.

Records available for selection by a user are maintained remotely from the client user terminal 110 in the database 140. The records in the database are accessed by a user via the client terminal 110. The user enters user preferences via graphic user interface 120 to enable a selection of one or more records based on the user's preferences. Whilst in this embodiment of the invention the records are maintained remotely in database 140, it will be appreciated that the records may also be made locally or remotely accessible to the user terminal 110 in any other convenient form, such as a CD-ROM or other portable or non-portable data storage device.

Each record in the database 140 is assigned a plurality of rankings determined in relation to a number of criteria. An interactive user interface provided on a client user terminal enables the user to submit preferences in relation to the same criteria or a sub-set of the criteria in relation to which the records have been ranked to enable the user to personalize the search.

The records available for selection in the database may correspond to a range of items such as books, movies, music, motor vehicles, holidays, careers and other items, products or services which may be suitable for selection by a user. In other embodiments, the records available for selection may correspond to persons or groups of persons, for example, in applications in which a user wishes to identify people having common interests or sharing common characteristics with them. In yet other embodiments, the records may correspond to companies, such as in applications in which a user selects a tradesman offering services or having skills that meet their needs. A skilled addressee will be able to envisage various other types of records and criteria associated with those records that may be desirable in a given application.

Figure 2:
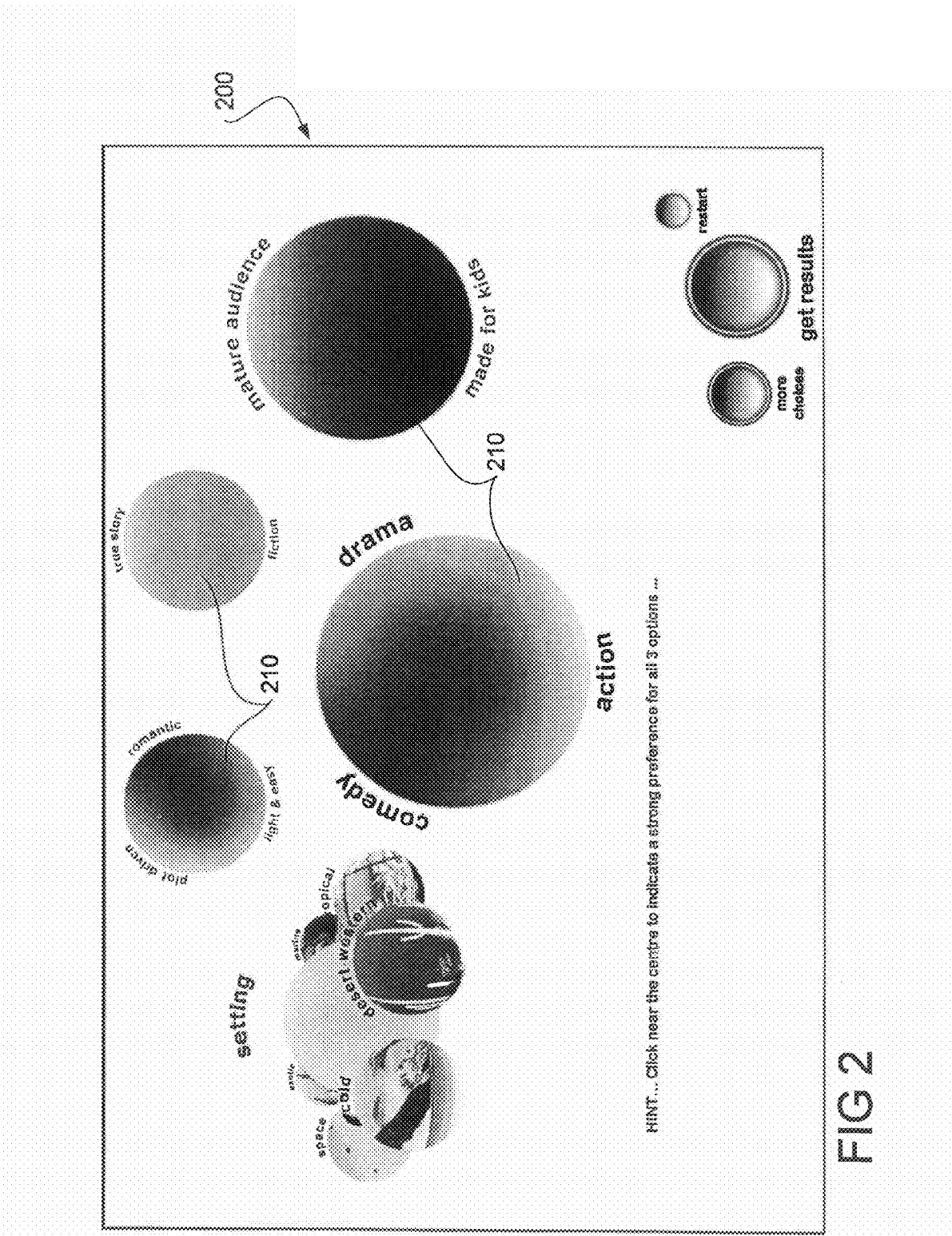
FIG. 2 is a screen view showing the interactive user interface according to an embodiment of the invention.

In the embodiment described herein, the records maintained in the database 140 correspond to film titles. Referring now to FIG. 2, the user is presented with an interactive user interface 200 on the client terminal 110. The interactive user interface 200 includes one or more graphical elements 210 each of which represents one criterion or a group of criteria. The interactive graphical user interface 200 is intended to offer users a simple, intuitive and user-friendly means of indicating user preferences in relation to a range of criteria.

The interactive graphical user interface 200 may be designed in any one of a number of ways providing that it meets the functionality of the following description. The graphical elements 210 used to represent various criteria may be two dimensional or three dimensional objects, shapes, or images. The graphical elements 210 may be patterned, coloured, shaded or highlighted in a manner so as to indicate and distinguish the various criteria represented by a single graphical element. Preferably, text is used to indicate the criteria that are represented by each graphical element 210. The graphical elements may be static or dynamic and may move around the display.

In order to indicate a preference for a criterion, the user selects a graphical element representing that criterion by means of a mouse, touch screen, remote pointer or other suitable selection means. Once selected, a graphical element is preferably visually enhanced either by highlighting the graphical element, increasing it in size or perspective, or otherwise making it more visually dominant on the display. In other embodiments of the invention, however, the graphical element need not be visually enhanced. Any non-selected graphical elements may stay visible in the background, decrease in size, perspective or brightness or even disappear from the display altogether. The selected graphical element may represent one criterion or a group of criteria.

Figure 3:
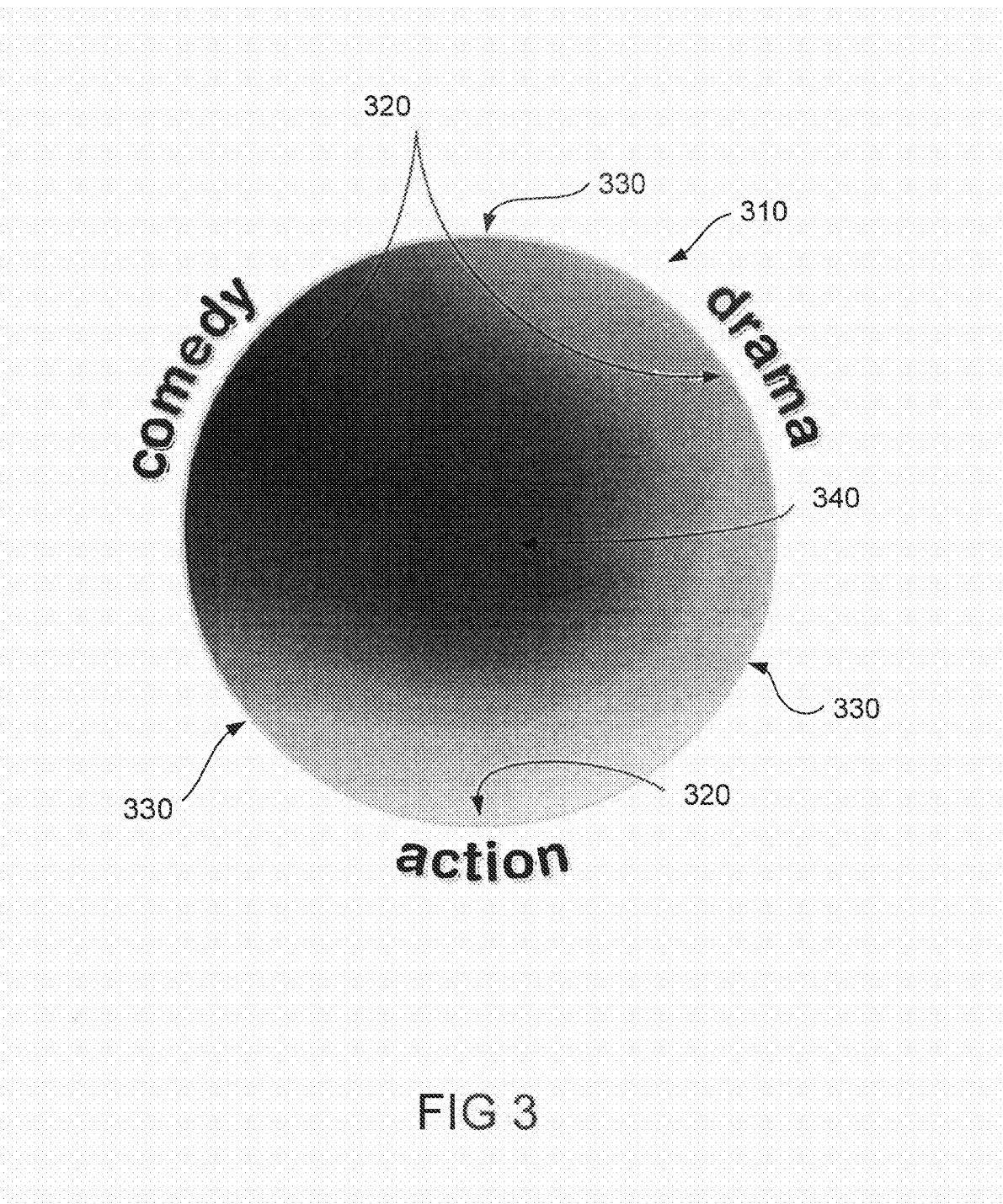
FIG. 3 is a close-up view of one of the graphical elements shown in FIG. 2.

Referring now to FIG. 3, the graphical element 310 selected by the user to indicate the user's preference may be a circle or sphere representing three different criteria based on movie genres: drama, comedy and action. The graphical element may be divided into three equally sized and differently coloured or shaded areas, each representing one of the three criteria. Preferably, each of the three criteria is associated with a single colour. For instance, envisage each of the criteria being represented by a primary colour: e.g. red, yellow and blue (the RYB colour model). The colours will be most intense in the region being proximal to the pole 320. In the regions between poles, the colours may be blended to provide regions of lower colour intensity, or in the case of primary colours, to form secondary colours, e.g. green, orange and purple. The use of colour in this manner provides a very visual and intuitive indicator of the degree of preference that a user is indicating for a particular criterion.

The criteria may be specifically labelled with text arranged evenly around the outside of the graphical element. The font and/or graphic design of the text may reflect the characteristics of each of the criteria in order to enhance the visual communication.

Each of the criteria represented by the graphical element 310 is associated with a pole 320. The pole 320 may be a region associated with the graphical element near to, or inclusive of, the text indicating the criteria. The pole may or may not be overlaid on the graphical element itself. This region will be a "hot spot" for each respective criterion, such that the closeness of the point selected by the user to the pole 320 indicates the degree of preference for the criterion associated with the pole 320. In the illustrated embodiment, wherein the graphical element 310 represents three criteria, if the user selects a point near to a pole 320 associated with one of the criteria, the user will be indicating a high degree of preference for that particular criterion and a relatively low degree of preference for the remaining two criteria represented by the graphical element 310. If the user selects a point on the outer edge of the graphical element 330, equidistant between two poles 320, then the user will be indicating a positive and equal preference for those criteria but a low preference for the remaining criterion. In the event that the user selects the centre of the graphical element 340, the user will be indicating a positive and equal preference for all three criteria. Accordingly, any point selected on the graphical element 310 will represent the user's relative preference between the three criteria, all in a single mouse-click/touch/or other means of selection. Optionally, the various text criteria names will visually diminish in brightness as the user moves the cursor away from the corresponding poles.

Optionally the colored zones of the graphical element extend outside the solid edge of the graphic in the form of a multi-colored glow that appears to radiate underneath the text criteria names. As the user floats the cursor across the various solid colored regions of the graphic and moves closer to a pole, the corresponding colored glow intensifies in color and/or brightness underneath the relevant criteria text.

Once a user has made a selection on a graphical element, that graphical element may recede into the background via lighting or perspective effects, or it may disappear from the display altogether. The remaining graphical elements will then reappear or become more visually dominant to enable the user to make further selections.

Figure 4:
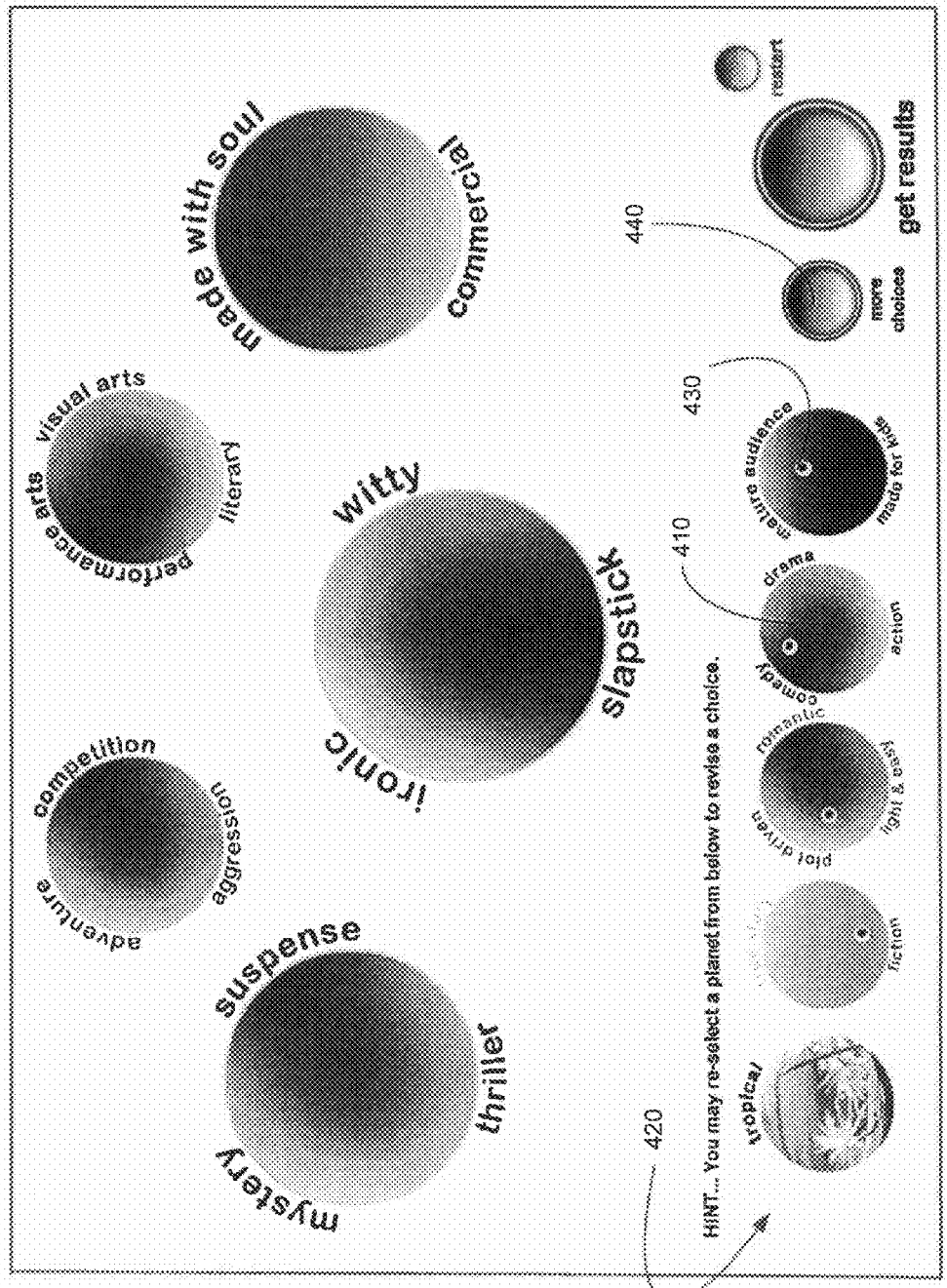
FIG. 4 is a screen view showing the interactive user interface according to an embodiment of the invention.

Referring now to FIG. 4, in an alternative embodiment, once a user has made a preference selection on a graphical element, the selected graphical element 410 may remain on the display and move to an area of the display 420 reserved for user selected graphical elements. In maintaining the presence of user selected graphical elements on the display, the user is assisted in keeping track of selections made and/or enabled to revise a previous selection by reselecting graphical elements from the reserved area of the display. As a further aid to the user, a selected graphical element may retain a visual mark 430, such as a dot or arrow, to visually indicate the point on the graphical element that was selected by the user. Again this enables a user to review and/or revise a previous selection.

Once a user has selected a graphical element and submitted the user preferences in relation to the criteria represented by the graphical element, additional graphical elements representing criteria related to the initial selection or sub-criteria may appear on the graphical user interface, thereby offering the user the opportunity to further refine their preferences. For example, after a selection by a user that indicates a positive degree of preference for comedy, a further graphical element representing three related criteria or sub-criteria such as slapstick, ironic and witty may appear on the graphical user interface. The user may then choose to (or choose not to) further refine the user preference for comedy by indicating the user's relative preference between the three sub-criteria.

Figure 5:
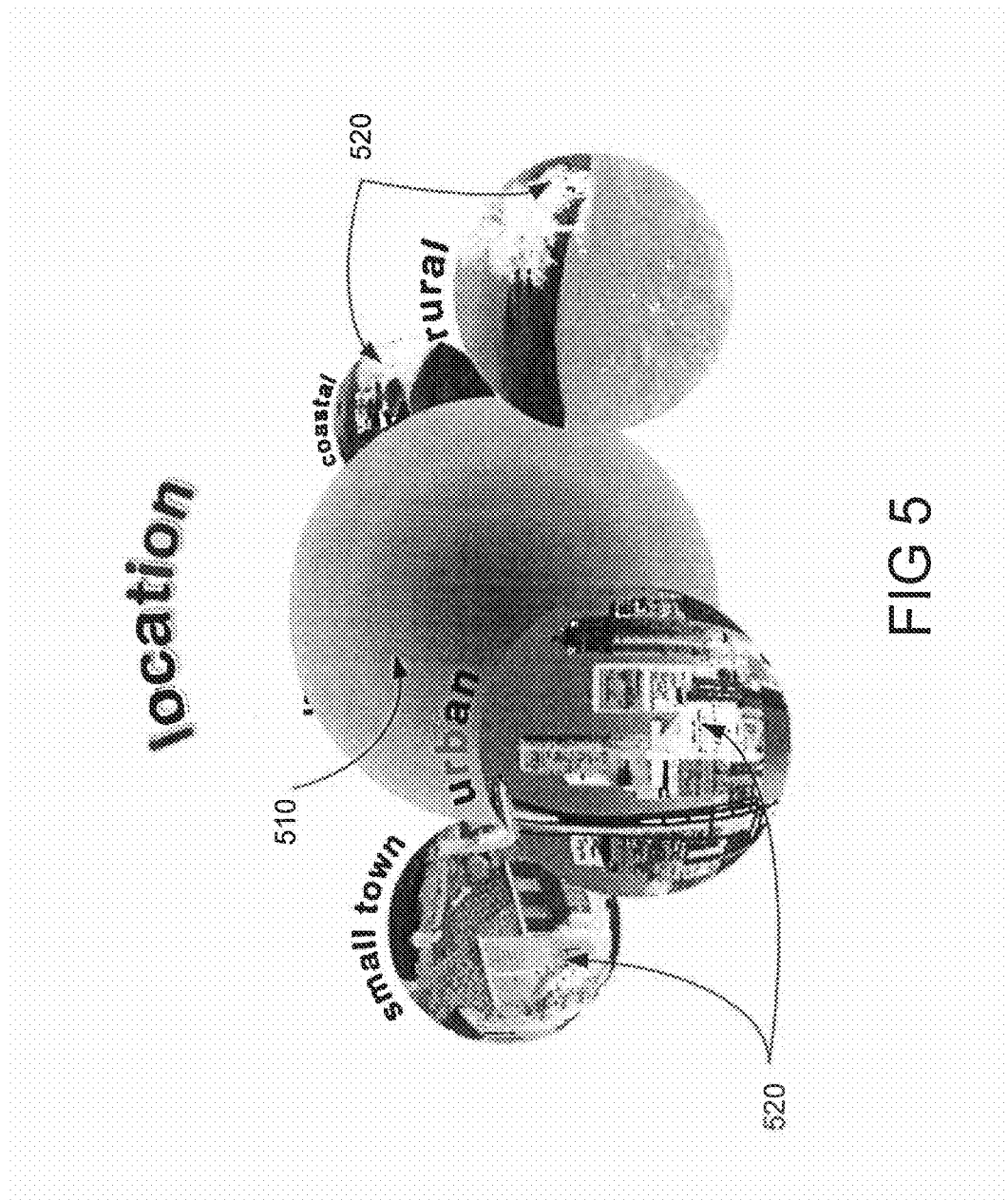
FIG. 5 is a close-up view of another of the graphical elements that may be shown on the interactive user interface.

In one embodiment, at least one of the graphical elements represents a single criterion and the graphical element includes a primary graphic representing the criterion. The primary graphic is associated with one or more secondary graphics each representing a sub-set of the criterion represented by the primary graphic. Referring now to FIG. 5, there is shown a primary graphic 510 in the form of a circle or sphere, with a series of secondary graphics 520 in the form of smaller circles or spheres, which appear to orbit around the primary graphic 510. Again, using the movie based system as an example, a primary graphic 510 representing a movie location criterion, may be associated with a number of smaller secondary graphics 520 representing a sub-set of the movie location criterion, for example: small town, urban, rural, coastal, etc. Having selected the primary graphic 510 by clicking on either the primary graphic 510 or a secondary graphic 520, the user may select one or more of the secondary graphics 520 to further refine the user preference. This representation of criteria by primary and secondary graphics is useful in an instance where there is no advantage in indicating a degree of preference between two or more sub-criteria, that is, when there is no overlap between the options.

For single graphical elements such as the graphical element 310 shown in FIG. 3, the user clicks on the graphic (which may or may not already be in the foreground) to indicate that they wish to make a choice on that graphical element. The user is then able to make a second click on the surface of that graphical element to indicate their preference. After making the preference choice, the graphical element disappears, or alternatively moves to the area reserved for previously selected graphical elements 420.

In other embodiments it is envisaged that the user may be able to simultaneously select a graphical element as well as select the desired point on that graphical element by executing a single click or a double click in an appropriate region of the graphical element to be selected.

In the case of primary/secondary graphic combinations such as that shown in FIG. 5, the user may select the set of graphics initially by clicking on either the primary graphic or one of the secondary graphics (whether or not those elements are in the foreground) to indicate that they want to make a selection on one or more of the secondary graphics. The user may then select none, one or more of the secondary graphics. Once a user has made a selection on a secondary graphic element, that secondary graphical element may recede into the background via lighting or perspective effects, or it may disappear from the display altogether. Optionally, it may remain on the display and move to an area of the display reserved for user selected graphical elements 420. The user selects the central primary graphic to indicate that they have finished making choices on the secondary graphics—at which point the remainder of that set of primary/secondary graphics disappears from the display. Optionally, the selected secondary graphic element(s) may remain on the display in an area of the display reserved for user selected graphical elements 420.

In one embodiment, it is envisaged that the primary graphic need not be visible to the user but its existence merely be "implied" by the orbiting secondary graphics.

Clicking on the primary graphic 510 does not necessarily generate any user preference values, but rather provides a means for indicating that the user has completed selection of the secondary graphics 520. Alternatively components of the primary/secondary graphic combination which have not been moved to the area of the display reserved for user selected graphical elements 420, may be automatically removed from the display after the user has made a predefined number of secondary graphic selections.

Referring now to FIG. 6, an optional feature is to provide yet another area 610 of the display that is reserved to display additional selection options, in response to the user selecting a "more choices" button 440 (see FIG. 4). The additional selection options appear as one or more additional graphical elements 620. Selecting any of the graphical elements from the area 610 of the display that is reserved to display additional selection options adds them to the general selection area 630 of the display. Selecting the "less choices" button 640 removes the remaining additional selection options from the display.

In one embodiment, the point on the graphical element selected by the user is converted into a numeric value. The numeric value corresponds to a user preference in relation to one of the criteria represented by the graphical element. Therefore, if the graphical element represents two criteria, a selected point will be converted to two numeric values, each value corresponding to one of the criteria. For example, the number range for any given criterion may be from 0 to 9. If the user selects a point on a graphical element representing three criteria, the point will be converted to three numeric values each corresponding to a user preference in relation to one of the criteria. That is, a single point selection by the user will result in three numeric values being generated: A=(0 to 9), B=(0 to 9) & C=(0 to 9). Preferably, the numeric value for any particular criterion will be higher when the user chooses a point closer to a pole associated with that criterion and lower when the user selects a point further from the pole.

Figure 7A:
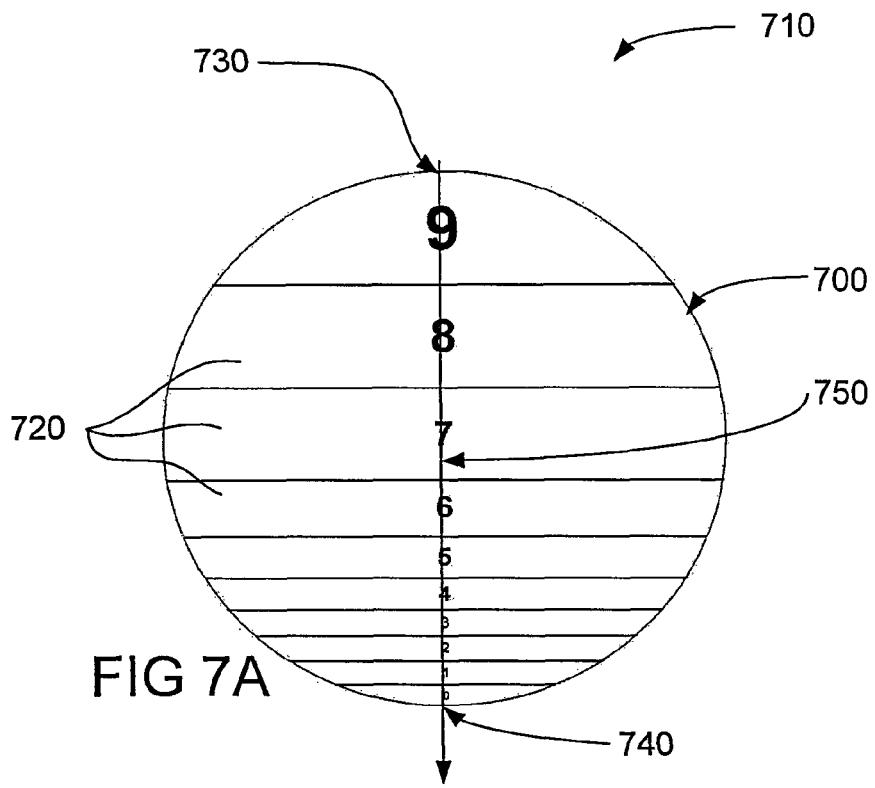
FIGS. 7A-7B are segment maps for a graphical element representing two criteria according to an embodiment of the invention.
Figure 7B:
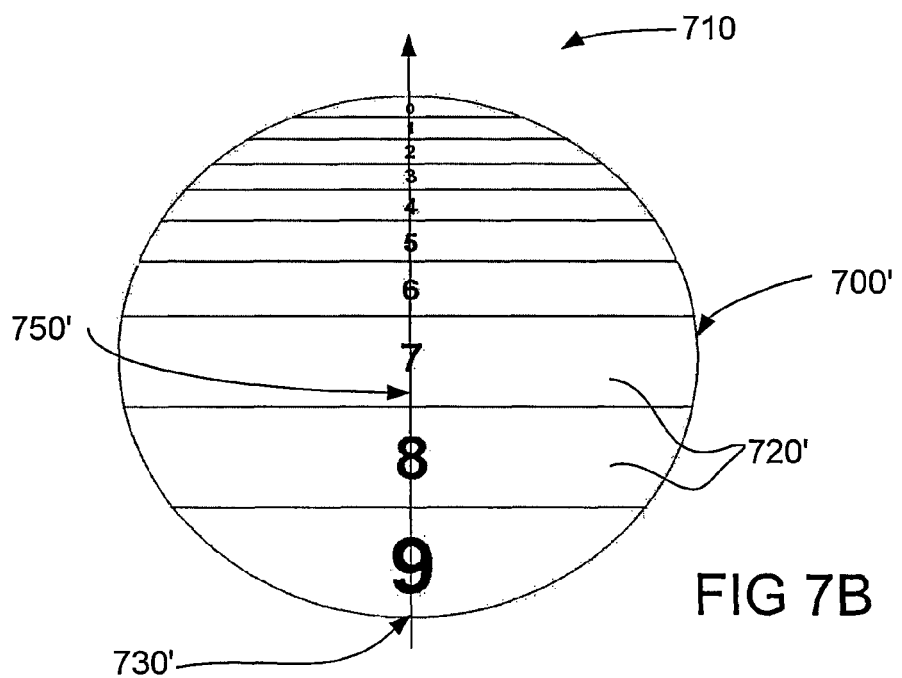

In one or more embodiments, the numeric values generated as a result of point selection by a user, are derived from one or more segment maps. A first embodiment of a segment map is shown in FIGS. 7A and 7B. As can be seen in FIG. 7A, each segment map 700 divides the graphical element 710 into a series of segments 720 relative to a pole 730 associated with one of the criteria represented by the graphical element 710. Each of the segments 720 in a series is assigned a numeric value which corresponds to a degree of user preference in relation to one of the criteria. Each of the segments 720 in the series extends along an axis 750 away from the pole 730 to an opposing point 740. The segment maps themselves are not intended to be visible to the user, but are superimposed with the graphical element which is visible to the user.

Referring now to FIG. 7B (in combination with FIG. 7A), a graphical element 710 is shown representing two criteria and having two poles 730 and 730' and accordingly, two segment maps 700 and 700', namely a first segment map 700 for deriving a first numeric value corresponding to a user preference in relation to the first criterion and dividing the graphical element into a series of segments 720 relative to the first pole 730, and a second segment map 700' which overlays the first segment map 700 to divide the graphical element 710 into further segments 720' relative to the second pole 730' that is diametrically opposed to the first pole 730. The first and second segment maps 700 and 700' are superimposed to enable the system to simultaneously derive two numeric values for any user selected point, corresponding to the user preference in relation to each of the two criteria represented by the graphical element 710.

Preferably, the extent of the segments 720 and 720' respectively along the axes 750 and 750' in a series decreases as the distance between the segment and the respective poles 730 and 730' increases. The relationship between the distance away from the pole and the corresponding numeric value may be non-linear. As a result, if the graphical element 710 represents two or more criteria, the mid point between the poles 730 and 730', and the centre point of the graphical element, should generate a numeric value of 7, on an arbitrary scale of 0 to 9, corresponding to each of the relevant criteria. The logic for a numeric value of 7 for the mid point between the two poles is that if the user chooses a point equidistant from two poles, then it is reasonable to assume that the user would expect to be indicating a positive preference for both of those options, hence a numeric value of 7, which indicates a more positive preference than a numeric value of 5 which would only indicate a "luke-warm" preference for either of the options displayed. It will be understood that whilst the choice of a numeric value of 7 in an arbitrary scale from 0 to 9 has been found to be satisfactory in the embodiment of the invention described herein, in other embodiments the value and the scale chosen may be different.

The point nearest to a pole should generate a numeric value of 9 for the criterion indicating a high or maximum degree of preference and the diametrically opposing point should generate a numeric value of 0 for the same criterion indicating a low or minimum degree of preference. For the graphical element 710 representing two criteria, the extent of the segments 720 and 720' respectively along the axes 750 and 750' progressively decreases the further the segment is away from the respective poles 730 and 730'.

Figure 8A:
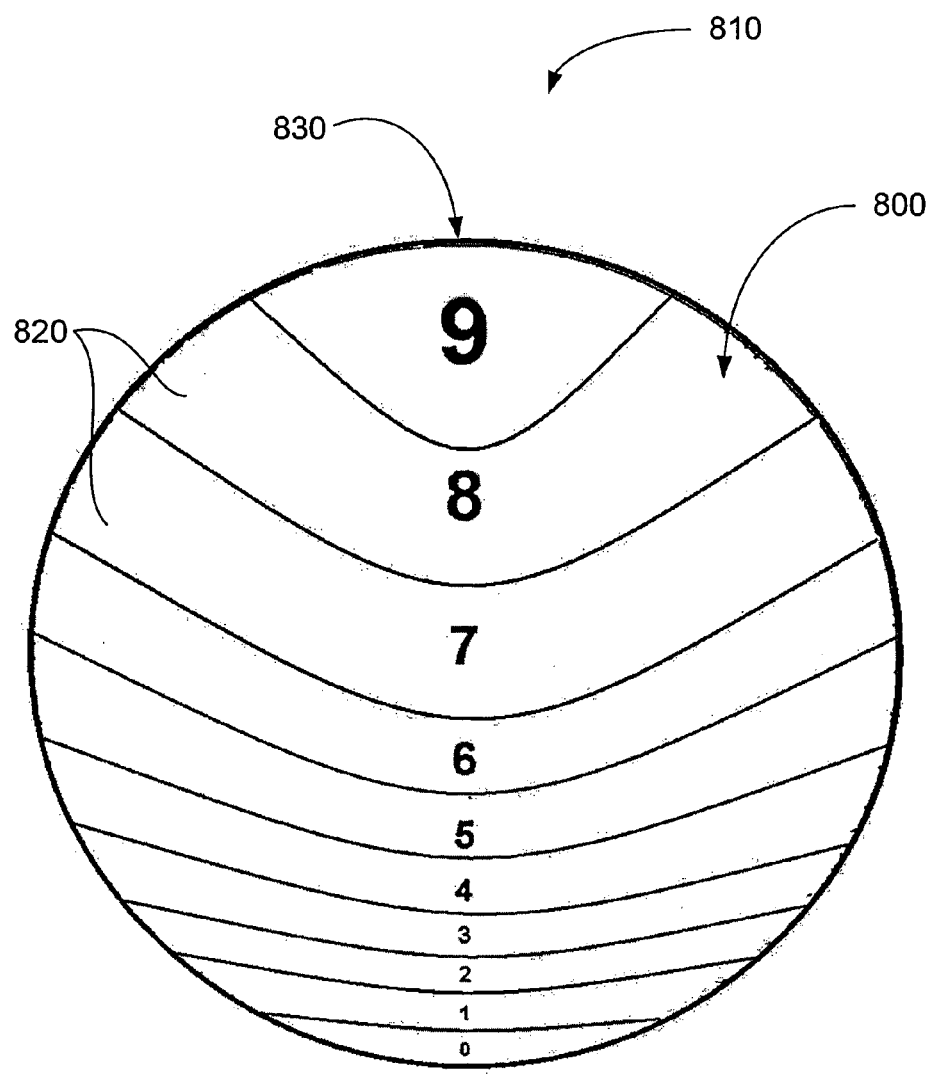
FIGS. 8A, 8B, and 8C are segment maps for a graphical element representing three criteria according to another embodiment of the invention.

FIG. 8A shows another example of a segment map. The segment map 800 divides the graphical element 810 into segments 820 relative to the first pole 830. It will be appreciated that the segment maps 700 and 800 are merely illustrative of a number of different types of segment maps that can be used in conjunction with a graphical element used by a user to select one or more criteria. Other segment maps may have different numbers of segments and the segments may be of a different form. In some embodiments, only one segment map will be used per graphical element, whilst in other embodiments two or more segment maps may be overlaid on a same graphical element.

Figure 8B:
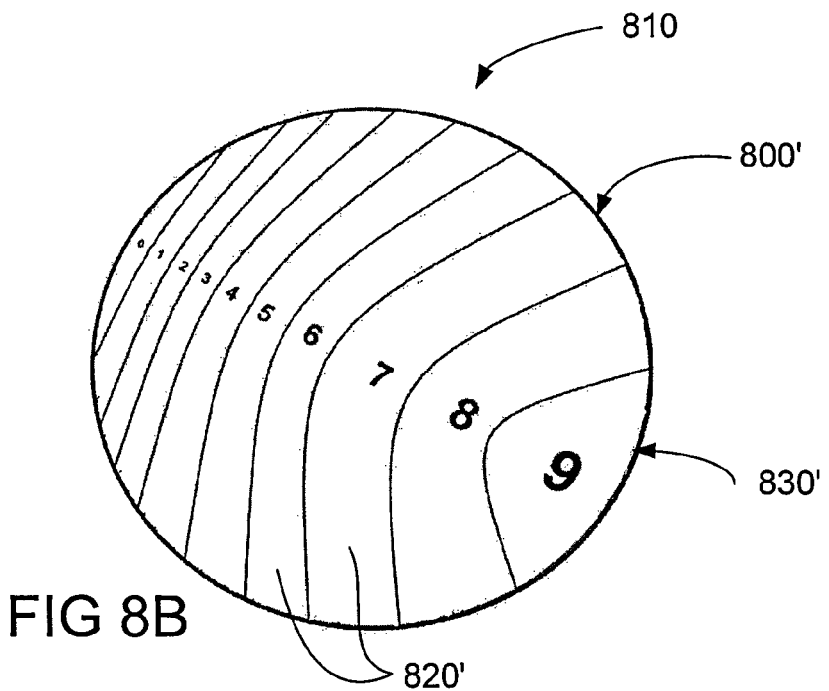
Figure 8C:
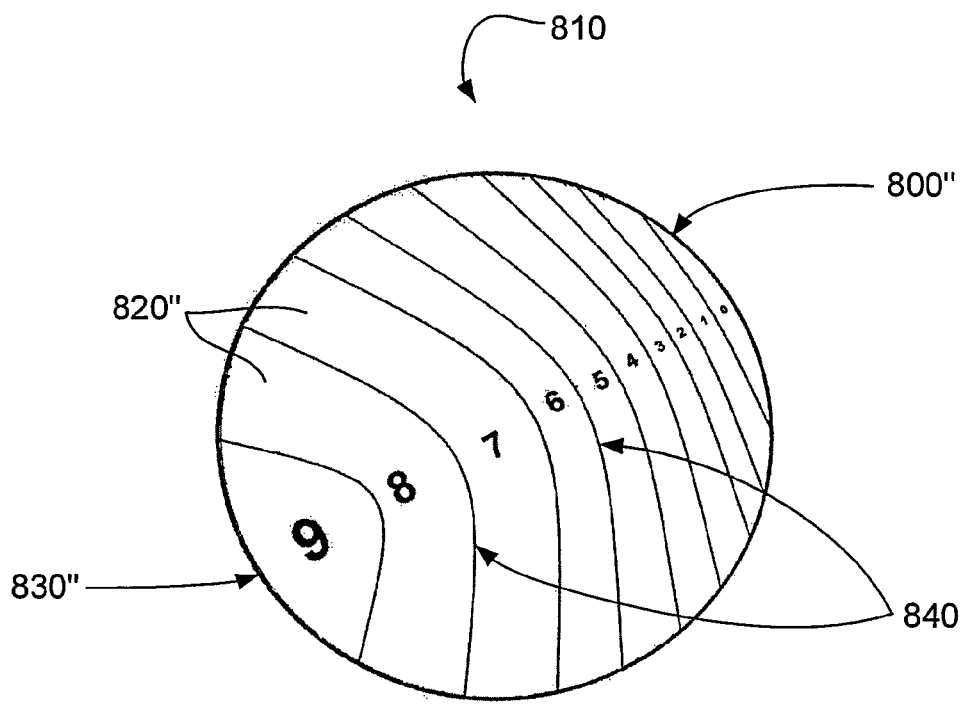

In this exemplary case, the segment map 800 is used for a graphical element 810 representing three criteria and having three poles. FIG. 8B shows a second segment map 800' which divides the graphical element 810 into segments 820' relative to a second pole 830'. FIG. 8C shows a third segment map 800" which divides the graphical element 810 into segments 820" relative to a third pole 830". The first, second and third segment maps are superimposed to enable the system to simultaneously derive three numeric values for any user selected point, corresponding to the user preference in relation to each of the three criteria represented by the graphical element.

Segment maps for a graphical element representing four criteria may be a variation of the three criteria segment maps, except that the curves 840 (see FIG. 8C) will be steeper and the four poles will be spaced apart 90 degrees around the edge of the graphical element. In an alternative embodiment, the system may derive the numeric values corresponding to the criteria represented by any multiple criteria graphical element by mathematically calculating the distance from the various poles to the point selected by the user.

In the case of graphical elements representing a single discrete criterion, or primary and secondary graphics each representing a single criterion and a sub-set of that criterion respectively, the numeric value recorded as a result of the user selecting a graphical element representing a discrete criterion may be a fixed value, of say 7, given that the user would expect to be indicating a strong preference for that criterion.

However, it will be appreciated that a segment map may also be used to overlay a map of numeric values on a graphical element representing a discrete criterion to enable the user to indicate a degree of preference for that criterion. In this case, the values may only range within a favourable preference range of, say, 7 to 9 relative to the above-described scale of 0 to 9. Alternatively, the values may range within the full preference range of 0 to 9.

Each of the records available for selection from the database is assigned a number of rankings which have been determined in relation to a plurality of criteria. The rankings are preferably intended to be objective and intuitive such that they will reflect the expectations of the average, "man-in-the-street" user. An expert or group of experts in the subject-matter to which the records relate, for example, books, movies, music or motor vehicles, is employed to determine the rankings of each record in relation to a range of criteria. The results of the ranking determination may be averaged over a number of experts to avoid the impact of any bias or statistical anomalies on the rankings.

The process of ranking a record in relation to a number of criteria may involve an expert assessing each record with regard to one criterion at a time, and considering that criterion in isolation with regard to the particular record. An expert ranking graphical user interface may be provided to one or more experts to enter rankings in a form quite similar to the interactive user interface displayed to the user. The expert ranking graphical user interface may additionally enable the experts to sort all records according to each criterion independently to facilitate relative ranking of each record to be confirmed in view of the ranking of all other records in relation to the same criteria.

Figure 9C:
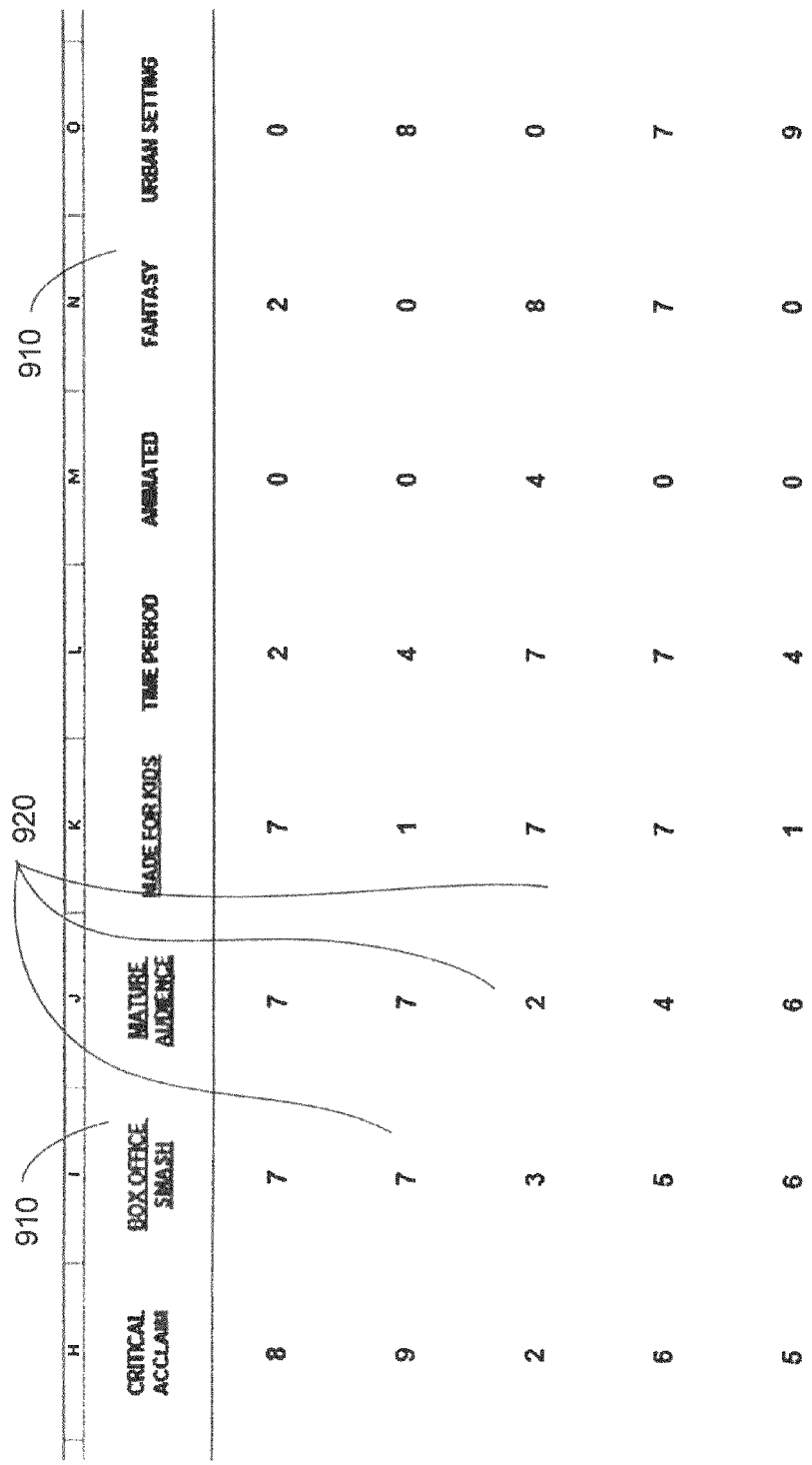
FIG. 9 is screen view showing the ranking of a sample of records in relation to a range of criteria according to an embodiment of the invention.
Figure 9D:
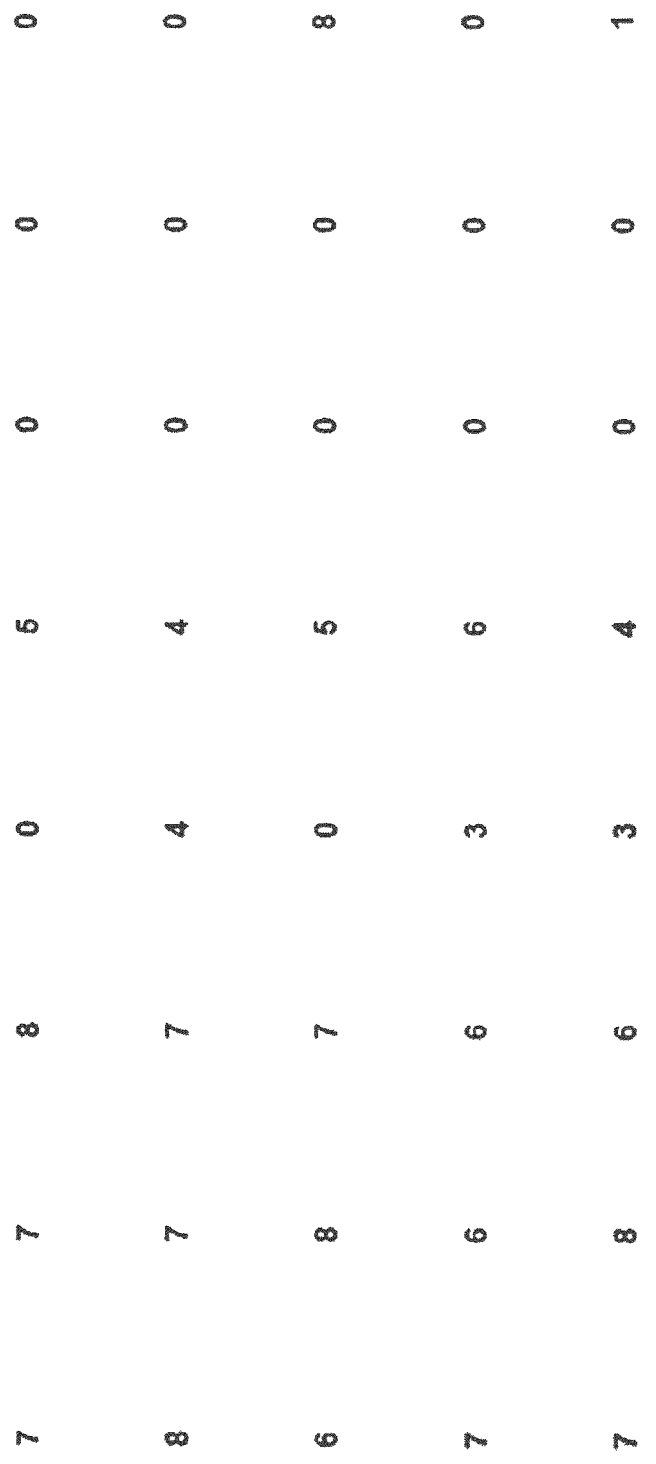

Referring now to FIG. 9, there is shown a screen view showing a sample of records available for selection from the database. In this example, the records correspond to movies and are displayed as movie titles in the column entitled TITLE 900. A selection of the criteria in relation to which the movie titles might be ranked are listed as the column headers 910 including: feature film, true story, critical acclaim, box office smash, mature audience, made for kids, time period, animated, fantasy, urban setting, suburban setting, etc.

The cells 920 beneath each of column headers 910 display the ranking determined for each movie title in relation to the criteria. In this case, the rankings assigned to each movie title have been determined as a value in the range of 0 to 9. These values reflect the relative degree to which each record rates or ranks in relation to each criterion and to each other record. Preferably, as with the numeric values corresponding to a degree of user preference, a non-linear number scale applies to the numeric values which correspond to the rankings so that a value of 0 indicates a minimum ranking, a value of 5 indicates partial or "luke-warm" ranking, a value of 7 indicates a good, undoubted, definite or positive ranking and a value of 9 indicates a "defining" or maximum ranking. A value of 9 is reserved for those records that stand out or excel in terms of the criterion in question, or those that are recognised as "defining" the criterion.

In an alternative embodiment, rather than using one or more experts to determine the rankings assigned to each record, rankings assigned to each record may be determined by individual users of the system who each enter their own rankings in relation to each of the plurality of criteria for each record which has been reviewed by the user. The series of ranking values associated with each record may be considered to comprise a metadata tag.

The system 100 enables a selection to be made from a plurality of records in the database, by capturing the user preferences and comparing the user preferences to the rankings assigned to each of the records available for selection. The comparison results in provision of one or more best-match records to the user, the best-match records being those whose rankings most closely correspond to the user preferences.

In one embodiment, the comparison of user preferences with the rankings assigned to each of the records involves computing the difference between the numeric value corresponding to the user preference in relation to each criteria and the numeric value corresponding to the ranking assigned for each record in relation to the same criterion. An overall match value for each record is generated by computing the sum of the differences between the user preference value and the ranking value assigned for each record corresponding to each of the criteria in relation to which a user preference has been captured. The closer to 0 the overall match value score computed for any record, the closer that record is to an ideal match to the user's preferences.

For example, the user preference for a particular criterion may correspond to a numeric value of 7. Examining three random records in the database, the ranking assigned in relation to the same criterion for each of those three records is say 1, 7 & 8. Therefore the differences between the record ranking and the user preference values are 6, 0 and 1 respectively. If the user elects not to indicate a preference in relation to any particular criteria, the individual difference calculations for those non selected criteria may not be included in the overall match value calculation.

The absolute difference values (6, 0 & 1) may be raised to an integer power (i.e. squared, cubed, etc.) to quasi-logarithmically increase or exaggerate the difference between the user preference and record criterion ranking values so, for example squaring the difference values changes them to: 36, 0 and 1 respectively. Being a perfect match, the second value does not change at all: 0 remains 0. The third difference value retains its difference value of 1 after squaring. And the first difference value changes significantly from 6 to 36. Accordingly, if the user preference is numerically close or equal to the ranking assigned to a record for the same criteria, it will remain the same value or relatively close to the value after raising to an integer power. The greater the difference between the user preference value and the criterion ranking value for a record, the more exaggerated that difference will become after raising to an integer power. If desirable, the factor by which difference values are increased may be made bigger by raising to an integer power of 3, 4 or more. Preferably, any criterion in relation to which the user chose not to indicate a preference should be excluded from the calculation.

In one embodiment, for every record, the difference values, or difference values that have been raised to an integer power as the case may be, are summed to give an overall match value score which represents the overall difference between the user preferences and the rankings in relation to a range of criteria for a particular record. By sorting the overall match value scores in ascending order the system is able to determine the best-matches to be provided to the user via the graphical user interface.

The above described method for matching user preferences with each record's rankings may be expressed as follows and as detailed below by Equation 1:

$$|\text{MATCH VALUE}| = |Ax-Ay|^z + |Bx-By|^z \ldots |Jx-Jy|^z \quad (1)$$

where $A_X$ to $J_X$ are the numeric values corresponding to the user preferences and $A_Y$ to $J_Y$ are the numeric values corresponding to the rankings for the same ten criteria ("A" to "J") for each record. Furthermore "Z" is the integer value and "|x−y|" denotes the absolute value of each difference calculation.

Figure 10B:
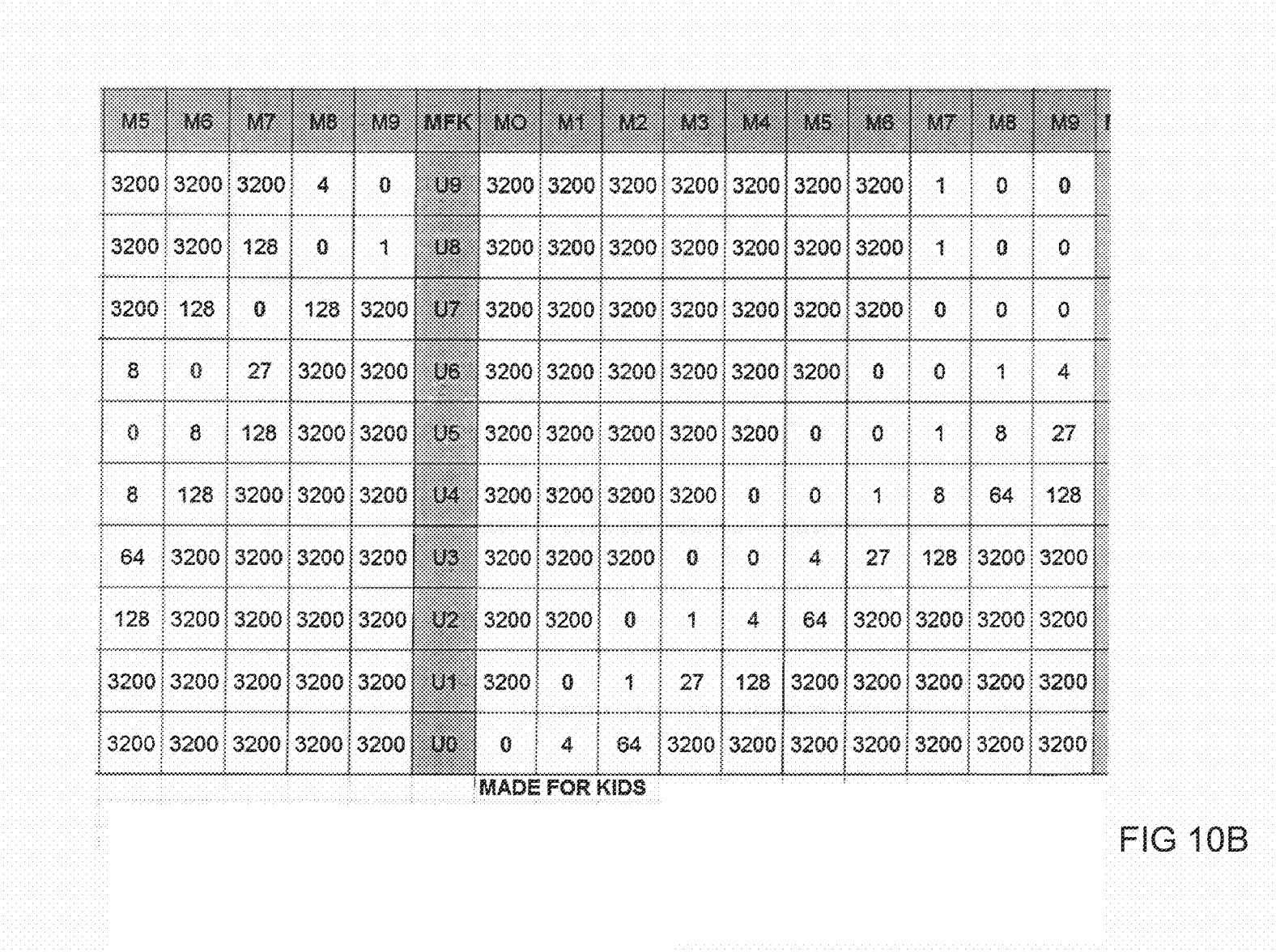

Referring now to FIG. 10, in an alternative embodiment, the individual difference values in relation to each user preference 1010 and corresponding record ranking 1020 for one or more criteria are derived from a series of tables or matrices 1030 rather than from a mathematical formula. Each matrix provides a numeric value 1040 for various permutations of user preference value and record ranking for a particular criterion 1050. The matrix-derived difference values are then summed to generate an overall match value for each record.

The matrix values may be customised to influence the best-match outcomes according to the characteristics of each criterion. For example, a table relating to a criterion such as "Made for Children" may be designed in an asymmetric manner so as to provide a favourable weighting to those movies better suited to children whilst also providing a significantly less favourable weighting to, or strong rejection of, movies not suited to children.

Figure 11:
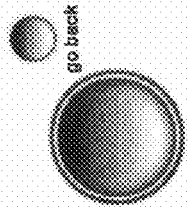
FIG. 11 is a screen view showing a display of best-match records according to an embodiment of the invention.

Referring now to FIG. 11, once the user has completed their interaction with the interactive user interface, a results page may appear which provides one or more best-match records whose rankings most closely correspond to the user preferences. The results may be displayed in a variety of ways. For example, individual movie results may be represented by images from movie advertising posters or DVD covers or the like. Alternatively, the results page may be displayed as a continually updating window on the main user preference screen of the graphical user interface. The results page may also display advertising messages which may relate to the user preferences and/or particular records. The user may optionally view the best-matches in batches of, for example, 10, 20, 50 or 100. When a user selects a particular best-match result, the interactive user interface may link to further information about that choice and/or an e-commerce system that enables the user to order, purchase and/or download the item.

The user may complete the selection process at any time and receive the best-match results, regardless of the number of preferences that the user has submitted relating to the available criteria. Submission of a user preference in relation to a single criterion is sufficient to provide some filtering of the records available for selection in the database. In the event the user submits no preferences but requests results, the results may reflect records that have the highest values on average for all criteria.

A help or prompt window may guide the user through their selections at any stage. Undo and Redo buttons, (Re)Start and Finish/Complete/Display Results buttons may also be provided. Optionally, a joy-stick or speed control may be provided to enable the user to steer or adjust the manner in which the graphical elements move around the graphic user interface.

Another user control may be included to allow the user the option of weighting particular criteria. That is, if the user wants one or more criteria to exert a greater influence over the computation of best-match records than other criteria. For example, it may be critical to a user searching for a movie title that the movie be suitable for children. The weighting option may include a scale to enable the user to indicate a degree of weighting desired in a range from "Not So Important" to "Mandatory". Various means of indicating weightings may be provided via the interactive user interface, such as for example, by the user holding a selection click/touch for a longer period of time or by pressing harder to indicate a "Mandatory" preference rather than a quick or light click/touch for a "Not So Important" choice. Another means by which a user may indicate weighting is by the user re-ordering the previously selected graphical elements into a row to indicate least to greatest order of importance. That is, by clicking on and dragging graphical elements which remain on the display as the "selected" criteria.

The user preference data captured from one or more users may be stored in one or more user preference profiles and stored in a user profile database for later retrieval. The user preference data may be subsequently output for market research purposes. Stored user profiles may also be used to each user's personal advantage by being retrieved when the user next interacts with the interactive user interface. For example the system may indicate, by use of a graphic device such as a cursor, arrow, target or dot on each graphical element previously selected by the user, the point on the graphical element where the user had previously indicated their preference. Alternatively, if the user previously selected a point in an area on a graphical element between say a Red and a Blue coloured option, then the graphical element may flash Purple to indicate that previous selection in the Purple zone. This enables the user to review and/or refine their user preferences based on the user's satisfaction with the previous set of best-match records.

The system 100 may be implemented using hardware, software or a combination thereof and may be implemented in one or more computer systems or processing systems. In particular, the functionality of the client user terminal 110 and its graphic user interface 120, as well as the server 130, may be provided by one or more computer systems capable of carrying out the above described functionality.

Figure 12:
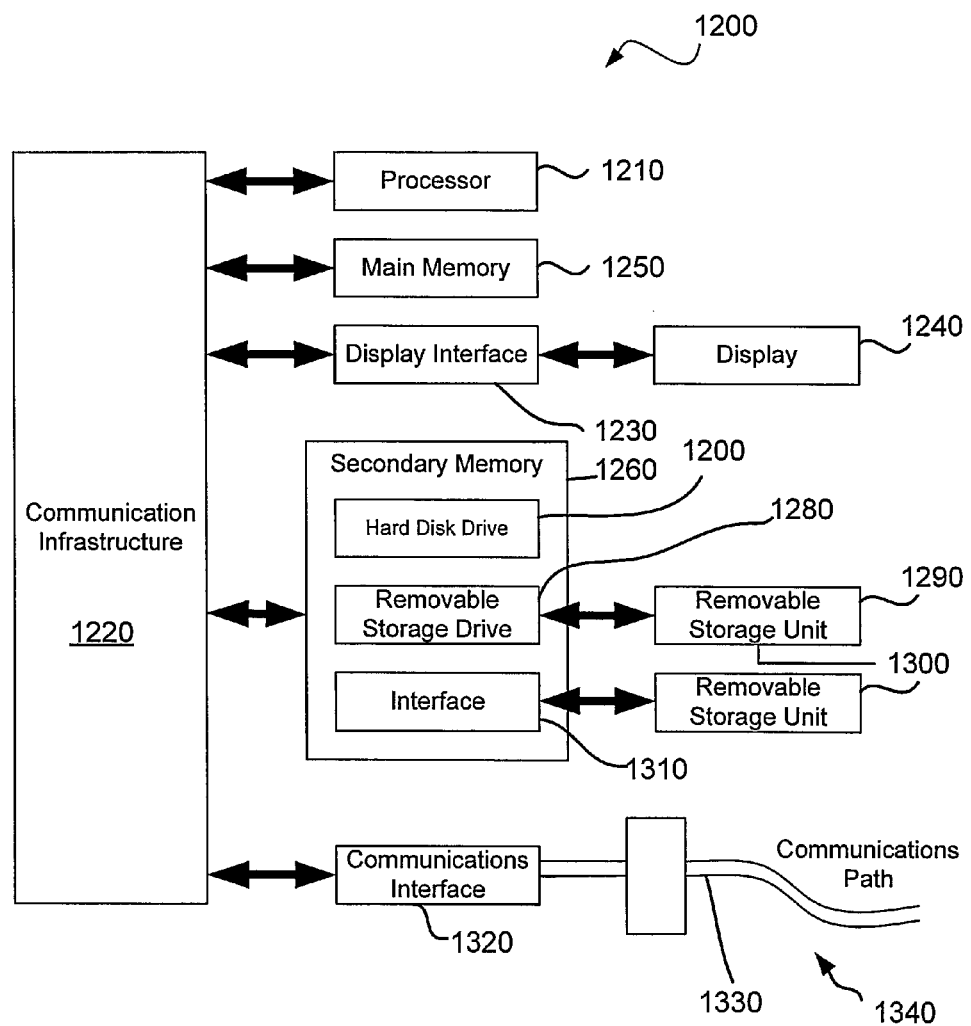
FIG. 12 is a schematic diagram showing various functional elements of the computer-enabled system of FIG. 1 in block form.

Such a computer system is illustrated in FIG. 12. In this Figure, an exemplary computer system 1200 includes one or more processors, such as processor 1210. The processor 1210 is connected to a communication infrastructure 1220. The computer system 1200 may include a display interface 1230 that forwards graphics, texts and other data from the communication infrastructure 1220 for supply to the display unit 1240. The computer system 1200 may also include a main memory 1250, preferably random access memory, and may also include a secondary memory 1260.

The secondary memory 1260 may include, for example, a hard disk drive, magnetic tape drive, optical disk drive, etc. The removable storage drive 1280 reads from and/or writes to a removable storage unit 1290 in a well known manner. The removable storage unit 1290 represents a floppy disk, magnetic tape, optical disk, etc.

As will be appreciated, the removable storage unit 1290 includes a computer usable storage medium having stored therein computer software in a form of a series of instructions to cause the processor 1210 to carry out desired functionality. In alternative embodiments, the secondary memory 1260 may include other similar means for allowing computer programs or instructions to be loaded into the computer system 1200. Such means may include, for example, a removable storage unit 1300 and interface 1310.

The computer system 1200 may also include a communications interface 1320. Communications interface 1320 allows software and data to be transferred between the computer system 1200 and external devices. Examples of communication interface 1320 may include a modem, a network interface, a communications port, a PCMIA slot and card etc. Software and data transferred via a communications interface 1320 are in the form of signals 1330 which may be electromagnetic, electronic, optical or other signals capable of being received by the communications interface 1320. The signals are provided to communications interface 1320 via a communications path 1340 such as a wire or cable, fibre optics, phone line, cellular phone link, radio frequency or other communications channels.

Although in the above described embodiments the invention is implemented primarily using computer software, in other embodiments the invention may be implemented primarily in hardware using, for example, hardware components such as an application specific integrated circuit (ASICs). Implementation of a hardware state machine so as to perform the functions described herein will be apparent to persons skilled in the relevant art. In other embodiments, the invention may be implemented using a combination of both hardware and software.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

What is claimed is:

1. A method for capturing user preferences in relation to a plurality of criteria, the user preferences to be used to facilitate selection of one or more records from a database, each of the records having been assigned a plurality of rankings, each ranking being determined in relation to one of the criteria, the method comprising the following steps:

displaying to the user an interactive user interface on a user terminal including one or more graphical elements, at least one of the graphical elements representing at least two criteria; and receiving a selection of a single point on the at least one graphical element to indicate the user's relative preference between the criteria represented by the graphical element;

wherein responsive to the selection of the single point, a first numeric value corresponding to the user preference in relation to a first criterion is derived from the single point's location on a first segment map overlaid on the graphical element representing at least two criteria, the first segment map divides the graphical element into a series of segments relative to a first pole associated with the first criterion and each segment in the series is assigned a numeric value corresponding to a degree of user preference in relation to the first criterion, and each of the segments in the series extends along an axis away from the corresponding pole to an opposing point, and a second numeric value corresponding to the user preference in relation to a second criterion is derived from the single point's location on a second segment map overlaid on the graphical element representing the at least two criteria and which is superimposed with the first segment map to divide the graphical element into a series of segments relative to a second pole associated with the second criterion, the second pole either diametrically opposing the first pole or an axis associated with the second pole intersecting an axis associated with the first pole, each segment in the series being assigned a second numeric value corresponding to a degree of user preference in relation to the second criterion; and selecting one or more records from the database using the first and second numeric values by comparing the first and second numeric values corresponding to the user preferences with the rankings assigned to each record, wherein such comparing involves computing a difference value between the numeric value corresponding to the user preference in relation to each criterion and the numeric value corresponding to the ranking assigned to each record in relation to the same criterion, and generating an overall match value for each record.

2. A method according to claim 1, wherein, for each segment map, the extent of each segment along the axis decreases as the distance of that segment from the corresponding pole increases.

3. A method according to claim 1, wherein the relationship between the distance from the pole and the corresponding numeric value is non-linear.

4. A method according to claim 1, wherein the rankings assigned to each record are determined by one or more experts.

5. A method according to claim 1, wherein the rankings assigned to each record are determined by one or more users who each enter their own rankings in relation to each of the plurality of criteria for each record which has been reviewed by the user.

6. A method according to claim 1, further comprising the step of raising to an integer power each of the differences between the user preference value and the ranking assigned to each record corresponding to each of the criteria prior to generating the overall match value.

7. A method according to claim 1, wherein the step of comparing the user preferences with the rankings assigned to each record involves deriving the individual difference values corresponding to the criteria from a series of matrices, each matrix providing a plurality of numeric values corresponding to various permutations of user preference values and record rankings for a particular criterion, and generating an overall match value for each record which corresponds to a sum of the individual difference values derived from the series of matrices.

8. A system for making a selection from a plurality of records in a database, each database record being assigned a plurality of rankings, each ranking being determined in relation to one of a plurality of criteria, the system comprising a processor and associated memory device for storing a series of instructions to cause the processor to carry out a method according to claim 1.

9. A non-transitory computer usable storage medium containing program instructions that when executed by a processor cause the processor to carry out a method according to claim 1.

10. A method according to claim 1, wherein more than one graphical element is displayed to the user on the user terminal and the method further comprises:

receiving a selection of a second single point on a second graphical element to indicate the user's relative preference between the criteria represented by the graphical element.

11. A method according to claim 1, wherein the overall match value corresponds to a sum of the differences between the user preference value and the ranking value corresponding to each of the criterion.

\* \* \* \* \*